United States Patent
Thelin

(10) Patent No.: US 6,654,193 B1
(45) Date of Patent: Nov. 25, 2003

(54) DISK DRIVE FOR RELOCATING A BLOCK OF DATA SECTORS NEAR A DEFECTIVE SERVO SECTOR TO EXPEDITE WRITE OPERATIONS

(75) Inventor: Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 302 days.

(21) Appl. No.: 09/846,077

(22) Filed: Apr. 30, 2001

(51) Int. Cl.$^7$ .............. G11B 5/09; G11B 27/36; G11B 5/596
(52) U.S. Cl. .............. 360/53; 360/31; 360/48; 360/77.08
(58) Field of Search .............. 360/53, 75, 77.08, 360/69, 31, 48; 714/710, 708

(56) References Cited

U.S. PATENT DOCUMENTS

| 5,450,251 A | | 9/1995 | Kitagawa |
| 6,034,831 A | * | 3/2000 | Dobbek et al. .............. 360/53 |
| 6,078,452 A | | 6/2000 | Kittilson et al. |

FOREIGN PATENT DOCUMENTS

JP     05066999 A     3/1993

* cited by examiner

Primary Examiner—Regina N. Holder
(74) Attorney, Agent, or Firm—Milad G. Shara, Esq.; Howard H. Sheerin, Esq.

(57) ABSTRACT

A disk drive is disclosed which detects a defective servo sector during a write operation and identifies a defective range of data sectors associated with the defective servo sector. A block relocation procedure is executed to identify a plurality of data sectors within the defective range and to relocate the plurality of data sectors to spare data sectors outside of the defective range.

8 Claims, 5 Drawing Sheets

DISK DRIVE FOR RELOCATING A BLOCK OF DATA SECTORS NEAR A DEFECTIVE SERVO SECTOR TO EXPEDITE WRITE OPERATIONS

BACKGROUND OF THE INVENTION

1. Field of the Invention

The present invention relates to disk drives for computer systems. More particularly, the present invention relates to a disk drive for relocating a block of data sectors near a defective servo sector to expedite write operations.

2. Description of the Prior Art

FIG. 1A shows a prior art format of a disk 2 employed in a disk drive of a computer system. The disk 2 comprises a plurality of radially-spaced, concentric tracks 4 which are partitioned into a plurality of data sectors. The disk 2 further comprises a plurality of embedded servo sectors 6 for use in servoing a head over the desired track during write and read operations. A sector (data or servo) typically comprises a preamble field 8 for synchronizing timing recovery and gain control within a read channel, and a sync mark 10 for symbol synchronizing to a data field 12. Data stored in an embedded servo sector 6 may include a track address which provides coarse head positioning information to a servo control system. An embedded servo sector 6 also typically comprises a plurality of servo bursts 14 recorded at precise offsets from a track's centerline to provide fine head positioning information to the servo control system.

During a write operation, the disk drive reads the servo bursts 14 of the servo sectors 6 to derive a tracking error for the head. The head is controlled so as to minimize the tracking error, ensuring that the data is written along the desired circumferential path with respect to the track. If the centerline offset of the head exceeds a predetermined threshold indicating a write failure, the disk drive will perform an "error recovery" procedure wherein the data sector is rewritten to the track after adjusting various parameters (e.g., read channel parameters). The error recovery procedure may perform numerous retries until an enabling set of parameters is found. If the error recovery procedure is unable to find an enabling set of parameters, the disk drive performs a relocation procedure to relocate the data sector to a spare data sector.

Relocating a data sector typically involves remapping the addressing scheme for the data sector. As shown in FIG. 1B, an exemplary mapping scheme is to assign a sequential physical block address (PBA) to each data sector of a track, wherein each PBA is accessed indirectly through a logical block address (LBA). When a data sector is relocated, the PBA of a spare sector is assigned to the LBA corresponding to the relocated data sector. For example, in FIG. 1B the data sector having a PBA=4 of a data track is relocated by assigning LBA=3 to a spare data sector having PBA=0 in a spare track. Whenever the disk drive accesses the data sector having LBA=3, the spare data sector PBA=0 of the spare track is accessed rather than the original data sector PBA=4 of the data track. The relocation information is typically stored in tables on the disk so that the information is preserved when the disk drive is powered down. The relocation procedure typically involves reading the relocation tables from the disk, updating the relocation tables, and then rewriting the relocation tables to the disk.

As illustrated in FIG. 1A, a data sector may need to be relocated during a write operation if a servo sector 6A becomes defective due, for example, to a grown defect on the medium. When this happens, the data sectors in the wedge 16A preceding the defective servo sector 6A as well as the data sectors in the two wedges 16B and 16C following the defective servo sector 6A will typically need to be relocated whenever a write operation is performed within this range. If a write operation involves multiple data sectors within the defective range associated with a defective servo sector, the disk drive will perform the error recovery and relocation procedure for each individual data sector which can significantly increase the latency of the write operation.

There is, therefore, the need to expedite write operations within a disk drive when a write failure occurs due to a defective servo sector.

SUMMARY OF THE INVENTION

The present invention may be regarded as a disk drive comprising a disk having a plurality of tracks, each track comprising a plurality of data sectors and a plurality of embedded servo sectors. A head is actuated radially over the disk for writing data to and reading data from the data sectors and for reading the embedded servo sectors. The disk drive comprises a disk control system for receiving a command from a host computer to write data to a plurality of data sectors. The disk control system writes the data to at least one of the plurality of data sectors, and processes the embedded servo sectors to verify the data was written substantially along a desired circumferential trajectory with respect to the track. The disk control system determines when one of the embedded servo sectors is defective and identifies a defective range of data sectors on the disk associated with the defective servo sector. A block relocation procedure is executed by the disk control system to identify at least two of the plurality of data sectors within the defective range and to relocate the at least two data sectors to spare data sectors outside of the defective range.

In one embodiment the disk drive further comprises a cache for storing the data to be written to the plurality of data sectors. The disk control system writes the data stored in the cache to non-relocated data sectors before writing data stored in the cache to the spare data sectors. In another embodiment, the disk drive comprises a non-volatile memory for storing a relocation table and the block relocation procedure retrieves the relocation table from the non-volatile memory, updates the relocation table in connection with relocating the at least two data sectors, and stores the updated relocation table in the non-volatile memory. In one embodiment, the non-volatile memory for storing the relocation table comprises the disk, and in another embodiment the non-volatile memory comprises semiconductor memory.

The present invention may also be regarded as a method of block relocating a plurality of data sectors in a disk drive during a write operation due to a defective servo sector. The disk drive comprises a disk having a plurality of tracks, each track comprising a plurality of data sectors and a plurality of embedded servo sectors, wherein a head is actuated radially over the disk for writing data to and reading data from the data sectors and for reading the embedded servo sectors. A command is received from a host computer to write data to a plurality of data sectors. Data is written to at least one of the plurality of data sectors, and the embedded servo sectors are processed to verify the data was written substantially along a desired circumferential trajectory with respect to the track. When a defective servo sector is detected, a defective range of data sectors on the disk associated with the defective servo sector is identified. At least two of the data sectors within the defective range are block relocated to spare data sectors outside of the defective range.

DESCRIPTION OF THE PREFERRED EMBODIMENTS

Figure 1A:
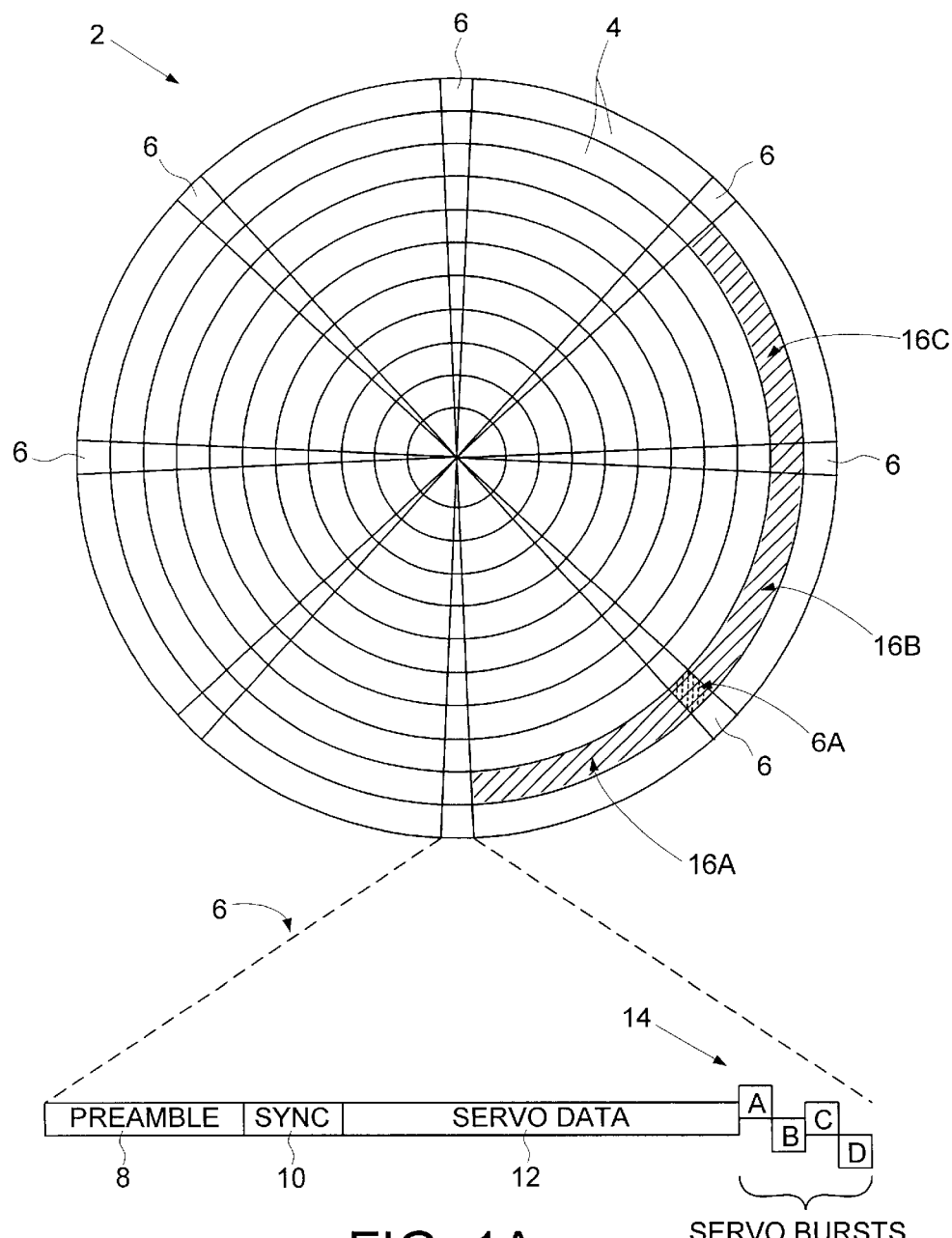
FIG. 1A shows an example disk format comprising a plurality of concentric tracks, wherein each track comprises a plurality of data sectors and a plurality of embedded, servo sectors.
Figure 1B:
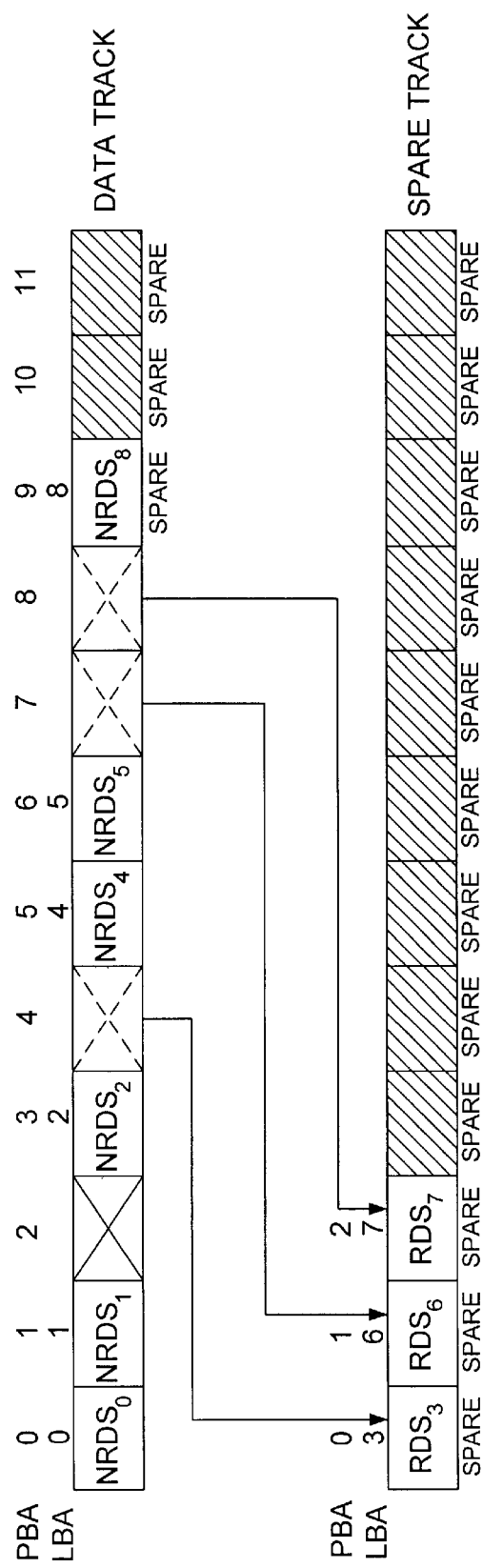
FIG. 1B shows an example relocation procedure wherein a defective data sector is relocated to a spare data sector by reassigning the physical block address of the spare data sector to a logical block address associated with the defective data sector.
Figure 2:
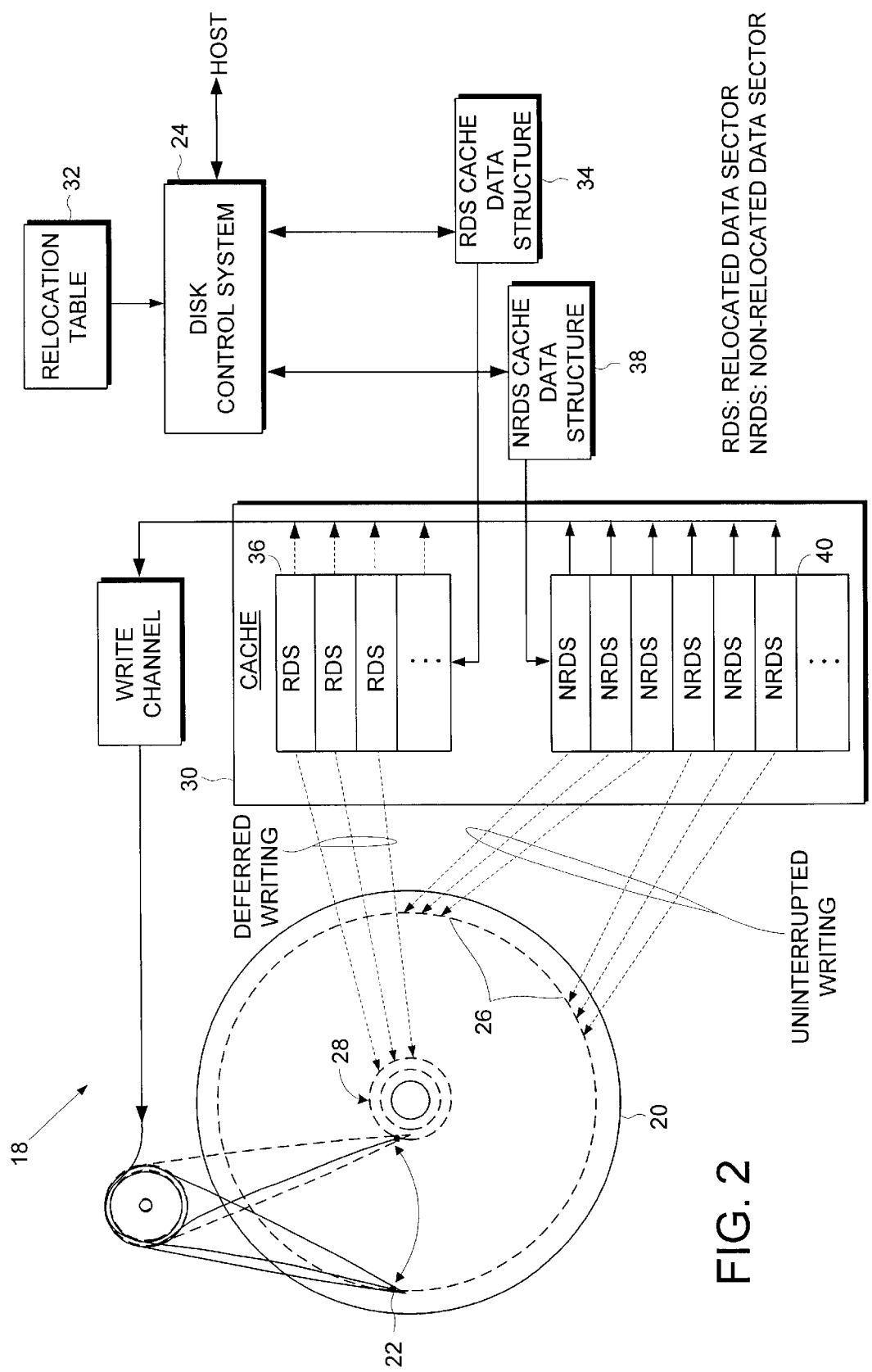
FIG. 2 shows a disk drive according to an embodiment of the present invention as comprising a disk control system for identifying a defective servo sector during a write operation, and for block relocating a plurality of sectors within a defective range associated with the defective servo sector.

FIG. 2 shows a disk drive 18 according to an embodiment of the present invention as comprising a disk 20 having a plurality of tracks, each track comprising a plurality of data sectors and a plurality of embedded servo sectors. A head 22 is actuated radially over the disk 20 for writing data to and reading data from the data sectors and for reading the embedded servo sectors. The disk drive 18 comprises a disk control system 24 for receiving a command from a host computer to write data to a plurality of data sectors. The disk control system 24 writes the data to at least one of the plurality of data sectors, and processes the embedded servo sectors to verify the data was written substantially along a desired circumferential trajectory with respect to the track. The disk control system 24 determines when one of the embedded servo sectors is defective and identifies a defective range 26 of data sectors on the disk 20 associated with the defective servo sector. A block relocation procedure is executed by the disk control system 24 to identify at least two of the plurality of data sectors within the defective range and to relocate the at least two data sectors to spare data sectors 28 outside of the defective range 26.

In the embodiment of FIG. 2, the disk drive 18 further comprises a cache 30 for storing the data to be written to the plurality of data sectors. The disk control system 24 writes the data stored in the cache to non-relocated data sectors before writing data stored in the cache to the spare data sectors. In another embodiment, the disk drive comprises a non-volatile memory for storing a relocation table 32 while the disk drive 18 is powered down. The block relocation procedure retrieves the relocation table 32 from the non-volatile memory, updates the relocation table 32 in connection with relocating the at least two data sectors, and stores the updated relocation table 32 in the non-volatile memory. In one embodiment, the non-volatile memory for storing the relocation table 32 comprises the disk 20, and in another embodiment the non-volatile memory comprises semiconductor memory (e.g., EEPROM). In this manner the contents of the relocation table 32 will be saved in the event of a power failure. While the disk drive is powered on, the contents of the relocation table 32 are stored in volatile semiconductor memory (e.g., RAM) for access by the disk control system 24.

In another embodiment of the present invention, the information for the relocated data sectors is distributed with other data stored on the disk 20 rather than in a table in one area of the disk 20. In one embodiment, the relocation information is stored in a field of a data sector, and in another embodiment the relocation information is stored in a field of an embedded servo sector.

As data is received from the host, the disk control system 24 evaluates the relocation table 32 to determine which data sectors have been relocated. The disk control system 24 uses a relocated data sector (RDS) data structure 34 to store the RDS data in a first area 36 of the cache 30, and a non-relocated data sector (NRDS) data structure 38 to store the NRDS data in a second area 40 of the cache 30. During the write operation, the disk control system first writes the NRDS data 40 to the disk 20 skipping over the relocated data sectors 26. After writing the NRDS data 40 to the disk 20, the disk control system 24 positions the head 22 over a track comprising spare data sectors 28 and writes the RDS data 36 to the disk 20. This minimize the seeks between the track comprising the non-relocated data sectors and the track comprising the spare data sectors.

To further reduce the latency of the write operation, when a defective servo sector is encountered the disk drive 18 performs a block relocation of the data sectors near the defective servo sector. Block relocating a range of data sectors associated with a defective servo sector avoids the latency in performing an "error recovery" procedure for each individual data sector. Further, the relocation table 32 is read from the disk 20, updated for the block of data sectors, and then re-written to the disk 20. This avoids the latency associated with reading and re-writing the relocation table 32 for each individual data sector within the defective range 26.

Figure 3A:
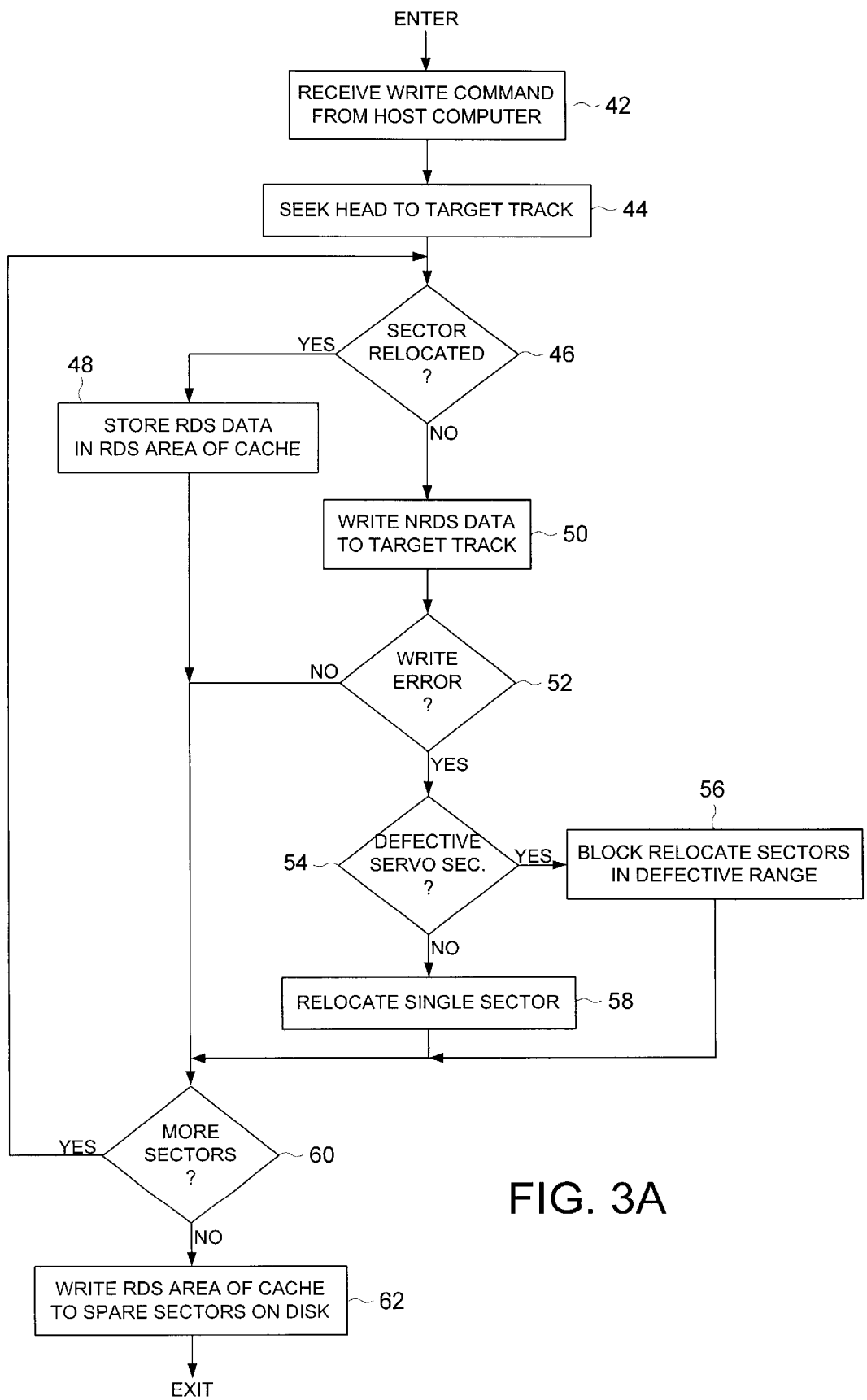
FIG. 3A is a flow chart according to an embodiment of the present invention wherein a plurality of data sectors are block relocated if a defective servo sector is encountered after a write failure is detected.

FIG. 3A illustrates a block relocation procedure according to one embodiment of the present invention. At step 42 the disk drive 18 receives a command from the host computer to write data to a plurality of data sectors, and at step 44 the disk drive 18 seeks the head 22 to the target track comprising the non-relocated data sectors. If at step 46 the relocation table 32 indicates the current data sector has been relocated, then at step 48 the RDS data received from the host is stored in the RDS area 36 of the cache 30. Otherwise, at step 50 the NRDS data is written to a data sector in the target track. At step 52 the tracking error generated from reading the servo bursts of the servo sector is evaluated to verify that the data was written to the track along the desired circumferential path. If the tracking error indicates the head deviated excessively from the desired path, the disk control system 24 may optionally perform an error recovery procedure and attempt to rewrite the data to the data sector.

If the error recovery procedure fails, then at step 54 the disk control system 24 determines whether the write error occurred due to a defective servo sector. If the write error was not due to a defective servo sector, then the current data sector is relocated at step 58. If a defective servo sector is encountered at step 54, then at step 56 the disk control system 24 executes a block relocation procedure to relocate a plurality of the data sectors within a predetermined range 26 associated with the defective servo sector. The disk control system 24 evaluates the write command received from the host computer to determine which data sectors fall within the defective range 26. The block relocation procedure updates the relocation table 32 to reflect the relocated data sectors, and then writes the relocation table 32 to the disk 20 for non-volatile storage in the event of a power failure. In one embodiment, the relocation procedure uses the RDS and NRDS cache data structures 34 and 38 in order to copy data (or reassign pointers) within the cache 30 from the NRDS data area 40 to the RDS data area 36.

If at step 60 there are more data sectors to be written to the disk 20, then the flow chart of FIG. 3A is reiterated starting with step 46 for the next data sector. The data corresponding to the data sectors relocated due to the defective servo sector is stored in the RDS area 36 of the cache 30. After writing all of the non-relocated data sectors to the disk 20, at step 62 the disk control system 24 writes the contents of the RDS area 36 of the cache 30 to the spare data sectors 28 on the disk 20.

Figure 3B:
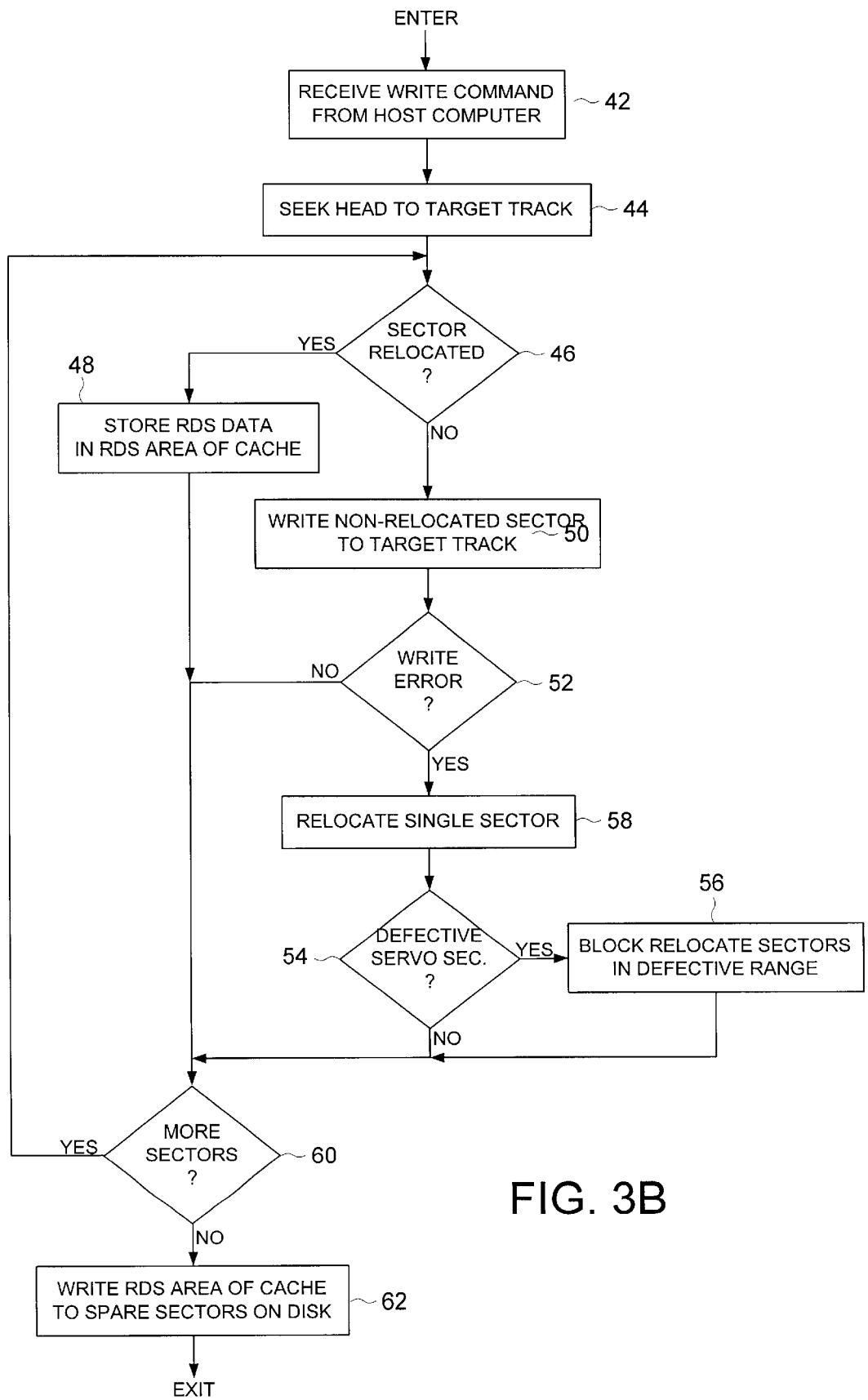
FIG. 3B is a flow chart according to an embodiment of the present invention wherein a single data sector is relocated after detecting a write failure, and if the write failure was caused by a defective servo sector, then a plurality of data sectors within a defective range associated with the defective servo sector are block relocated.

FIG. 3B is a flow chart according to an alternative embodiment of the present invention. In this embodiment, when a write error is detected at step 52 the current data sector is relocated at step 58. If at step 54 the current data sector was relocated due to a defective servo sector, then at step 56 a plurality of data sectors associated with the defective servo sector are also relocated.

I claim:

1. A disk drive comprising:
   (a) a disk comprising a plurality of tracks, each track comprising a plurality of data sectors and a plurality of embedded servo sectors;
   (b) a head actuated radially over the disk for writing data to and reading data from the data sectors and for reading the embedded servo sectors;
   (c) a cache; and
   (d) a disk control system for receiving a command from a host computer to write data to a plurality of data sectors, wherein the disk control system for:
      storing the data to be written to the plurality of data sectors in the cache;
      writing the data to at least one of the plurality of data sectors;
      processing the embedded servo sectors to verify the data was written substantially along a desired circumferential trajectory with respect to the track;
      determining when one of the embedded servo sectors is defective and identifying a defective range of data sectors on the disk associated with the defective servo sector;
      performing a block relocation procedure to identify at least two of the plurality of data sectors within the defective range and to relocate the at least two data sectors to spare data sectors outside of the defective range;
      writing the data stored in the cache to non-relocated data sectors following the defective range of data sectors; and
      writing data stored in the cache corresponding to the defective range of data sectors to the spare data sectors.

2. The disk drive as recited in claim 1, wherein:
   (a) the disk drive comprises a non-volatile memory for storing a relocation table; and
   (b) the block relocation procedure updates the relocation table in connection with relocating the at least two data sectors and stores the updated relocation table in the non-volatile memory.

3. The disk drive as recited in claim 2, wherein the non-volatile memory comprises the disk.

4. The disk drive as recited in claim 2, wherein the non-volatile memory comprises semiconductor memory.

5. A method of block relocating a plurality of data sectors in a disk drive during a write operation due to a defective servo sector, the disk drive comprising a disk having a plurality of tracks, each track comprising a plurality of data sectors and a plurality of embedded servo sectors, a head actuated radially over the disk for writing data to and reading data from the data sectors and for reading the embedded servo sectors, and a cache, the method comprising the steps of:
   (a) receiving a command from a host computer to write data to a plurality of data sectors;
   (b) storing the data to be written to the plurality of data sectors in the cache;
   (c) writing the data to at least one of the plurality of data sectors;
   (d) processing the embedded servo sectors to verify the data was written substantially along a desired circumferential trajectory with respect to the track;
   (e) determining when one of the embedded servo sectors is defective and identifying a defective range of data sectors on the disk associated with the defective servo sector;
   (f) identifying at least two of the plurality of data sectors within the defective range;
   (g) block relocating the at least two data sectors to spare data sectors outside of the defective range;
   (h) writing the data stored in the cache to non-relocated data sectors following the defective range of data sectors; and
   (i) writing data stored in the cache corresponding to the defective range of data sectors to the spare data sectors.

6. The method as recited in claim 5, wherein the disk drive further comprises a non-volatile memory for storing a relocation table, the step of block relocating the at least two data sectors comprises the steps of:
   (a) updating the relocation table in connection with block relocating the at least two data sectors; and
   (b) storing the updated relocation table in the non-volatile memory.

7. The method as recited in claim 6, wherein the non-volatile memory comprises the disk.

8. The method as recited in claim 6, wherein the non-volatile memory comprises semiconductor memory.

* * * * *